US008675997B2

(12) United States Patent
Zuniga et al.

(10) Patent No.: US 8,675,997 B2
(45) Date of Patent: Mar. 18, 2014

(54) FEATURE BASED IMAGE REGISTRATION

(75) Inventors: Oscar Zuniga, Fort Collins, CO (US);
Stephen Pollard, Dursley (GB); Shane D Vosa, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 79 days.

(21) Appl. No.: 13/193,988

(22) Filed: Jul. 29, 2011

(65) Prior Publication Data
US 2013/0028519 A1    Jan. 31, 2013

(51) Int. Cl.
*G06K 9/32*    (2006.01)
*G06K 9/40*    (2006.01)

(52) U.S. Cl.
USPC .......................................... 382/294; 382/260

(58) Field of Classification Search
USPC .......... 382/168–172, 190, 260–261, 294–296
See application file for complete search history.

(56) References Cited

U.S. PATENT DOCUMENTS

| | | | |
|---|---|---|---|
| 6,510,244 B2 | 1/2003 | Proesmans et al. | |
| 6,711,293 B1 * | 3/2004 | Lowe | 382/219 |
| 7,440,008 B2 | 10/2008 | Lai et al. | |
| 7,548,659 B2 | 6/2009 | Ofek et al. | |
| 7,715,654 B2 * | 5/2010 | Chefd'hotel et al. | 382/294 |
| 8,027,514 B2 * | 9/2011 | Takaki et al. | 382/103 |
| 8,165,401 B2 * | 4/2012 | Funayama et al. | 382/190 |
| 2007/0086678 A1 * | 4/2007 | Chefd'hotel et al. | 382/294 |
| 2009/0066800 A1 | 3/2009 | Wei | |
| 2009/0087023 A1 * | 4/2009 | Porikli et al. | 382/103 |
| 2009/0123082 A1 | 5/2009 | Atanssov et al. | |
| 2009/0238460 A1 * | 9/2009 | Funayama et al. | 382/181 |
| 2010/0092093 A1 | 4/2010 | Akatsuka et al. | |
| 2010/0157070 A1 | 6/2010 | Mohanty et al. | |
| 2010/0239172 A1 | 9/2010 | Akiyama | |
| 2011/0028844 A1 * | 2/2011 | Hyun et al. | 600/443 |
| 2011/0038540 A1 | 2/2011 | Ahn et al. | |
| 2011/0085049 A1 | 4/2011 | Dolgin et al. | |
| 2012/0183224 A1 * | 7/2012 | Kirsch | 382/195 |

OTHER PUBLICATIONS

Wei-Ting Lee; Hwann-Tzong Chen; , "Histogram-based interest point detectors," Computer Vision and Pattern Recognition, 2009. CVPR 2009.*
Chen et al, Efficient Extraction of Robust Image Features on Mobile Devices, ISMAR '07 Proceedings of the 2007 6th IEEE and ACM International Symposium on Mixed and Augmented Reality, pp. 1-2.*
Bay et al, SURF: Speeded Up Robust Features, Leonardis, H. Bischof, and A. Pinz (Eds.): ECCV 2006, Part I, LNCS 3951, pp. 404-417, 2006.*
Bay, et al. SURF: Speeded up robust features. In ECCV, 2006.
Buehler, C., et al. Non-Metric Image-Based Rendering for Video Stabilization. IEEE Computer Vision and Pattern Recognition Conference. vol. 2. pp. 609-614. Dec. 2001.

(Continued)

*Primary Examiner* — Andrae S Allison
(74) *Attorney, Agent, or Firm* — Erik Anderson

(57) ABSTRACT

Example embodiments disclosed herein relate to feature based image registration. Feature based image registration determines correspondence between image features such as points, lines, and contours to align or register a reference or first image and a target or second image. The examples disclosed herein may be used in mobile devices such as cell phones, personal digital assistants, personal computers, cameras, and video recorders.

25 Claims, 10 Drawing Sheets

(56) References Cited

OTHER PUBLICATIONS

Ikemura, et al. Real-Time Human Detection Using Relational Depth Similarity Features. Dept. of Computer Science, Chubu University.

Litvin, et al. Probablistic video stabilization using kalman filtering and mosaicking. ECE Department. Boston University. Boston, MA 02215.

Liu, et al. Content Preserving Warps for 3D Video Stabilization. ACM Transactions on Graphics. Article No. 44, 2009.

Lowe, D.G. Distinctive Image Features from Scale Invariant Keypoints. International Journal of Computer Vision. 60 (2): 91-110. 2004.

Matsushita, et al. Full-frame video stabilization with motion inpainting. IEEE Transactions on Pattern Analysis and Machine Intelligence, pp. 1150-1163. 2006.

Ratakonda, K. Real-Time digital video stabilization for multi-media applications. Dept. of Electrical and Computer Engineering. University of Illinois. 1998. IEEE.

* cited by examiner $$f_{xx} = [1 \underbrace{0 \cdots 0}_{(N-1) \text{ ZEROS}} -2 \underbrace{0 \cdots 0}_{(N-1) \text{ ZEROS}} 1]$$

$$f_{yy} = [1 \underbrace{0 \cdots 0}_{(N-1) \text{ ZEROS}} -2\ 0 \cdots 0\ 1]^T$$

WHERE T INDICATES A TRANSPOSITION OF THE KERNEL $$f_{xy} = \begin{bmatrix} 1 & 0 & \cdots & 0 & -1 \\ 0 & & & & 0 \\ \vdots & & & & \vdots \\ 0 & & & & 0 \\ -1 & 0 & \cdots & 0 & 1 \end{bmatrix} \Big\} (N-1) \text{ ROWS OF ZEROS}$$

$$\underbrace{\phantom{xxxxxxxxxx}}_{(N-1) \text{ COLUMNS OF ZEROS}}$$

FIG. 11

FEATURE BASED IMAGE REGISTRATION

BACKGROUND

A challenge exists to deliver quality and value to consumers, for example, by providing mobile devices, such as cell phones and personal digital assistants, that are cost effective. Additionally, businesses may desire to provide new features to such mobile devices. Further, businesses may desire to enhance the performance of one or more components of such mobile devices.

BRIEF DESCRIPTION OF THE DRAWINGS

The following detailed description references the drawings, wherein:

FIG. 11i shows an example of kernels for computing second-order partial derivatives.

DETAILED DESCRIPTION

Image registration is a technology for transforming different sets of data into one coordinate system. The data may be multiple photographs, multiple video frames, data from different sensors, from different times, or from different viewpoints. Image registration allows this data to be compared or integrated and enables many applications such as video stabilization, tracking, multi-image fusion for high dynamic range, and still image stabilization.

One type of image registration is feature based. In this type of image registration, one of the images is referred to as the reference and the second image is referred to as the target. Feature based image registration determines correspondence between image features such as points, lines, and contours. Once the correspondence between a number of points in the reference and target images is known, a transformation is then determined to map the target image to the reference image.

Many feature based image registration methods are too computationally expensive for real time performance in many mobile device applications. For example, some feature based image registration methods extract features at multiple scales and generate feature descriptors that are invariant to orientation, scale, and intensity. This invariance is needed for matching images obtained from different viewpoints in three-dimensional (3D) computer vision tasks. This invariance comes at a steep computational cost, making these methods impractical for applications that demand real time performance in mobile devices.

A need therefore exists for a feature based image registration method that is accurate and fast enough to enable real time performance in mobile devices. For many applications involving video and bursts of still images, the changes of viewpoint from frame to frame occur relatively slowly. This fact is utilized by the present invention to create such a feature based image registration method.

Figure 1:
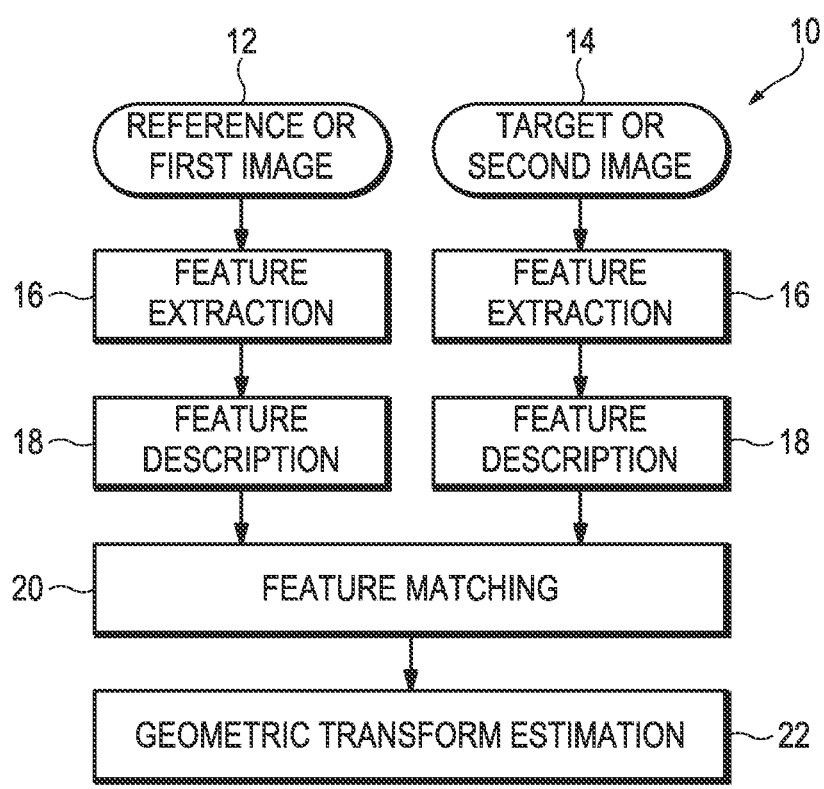
FIG. 1 shows a block diagram of an example of a feature based image registration method.

A block diagram of an example of a feature based image registration method 10 is shown in FIG. 1. As can be seen in FIG. 1, method 10 includes several modules or components to which both reference or first image 12 and target or second image 14 are input. Method 10 includes a feature extraction component 16 that operates on both first image 12 and second image 14. As will be discussed in more detail below, feature extraction component 16 detects key points or salient features in reference image 12 and target image 14. Method 10 also includes a feature description module 18 that operates on both reference or first image 12 and target or second image 14. As will be also discussed in more detail below, feature description module 18 extracts a feature descriptor for each key point of reference or first image 12 and each key point of target or second image 14 that includes a small image patch centered around each such key point.

Method 10 additionally includes a feature matching component 20 that additionally operates on both first image 12 and second image 14. As will be additionally discussed in more detail below, feature matching component 20 selects pairs of key points for each of first image 12 and second image 14 based on a measure of closeness of their feature descriptors. Method 10 further includes a geometric transform estimation module 22. As will be further discussed below in more detail, geometric transform estimation module 22 utilizes a list of matching pairs of key points selected by feature matching module 20 and the positions of such key points to map reference image 12 into target image 14.

Figure 2:
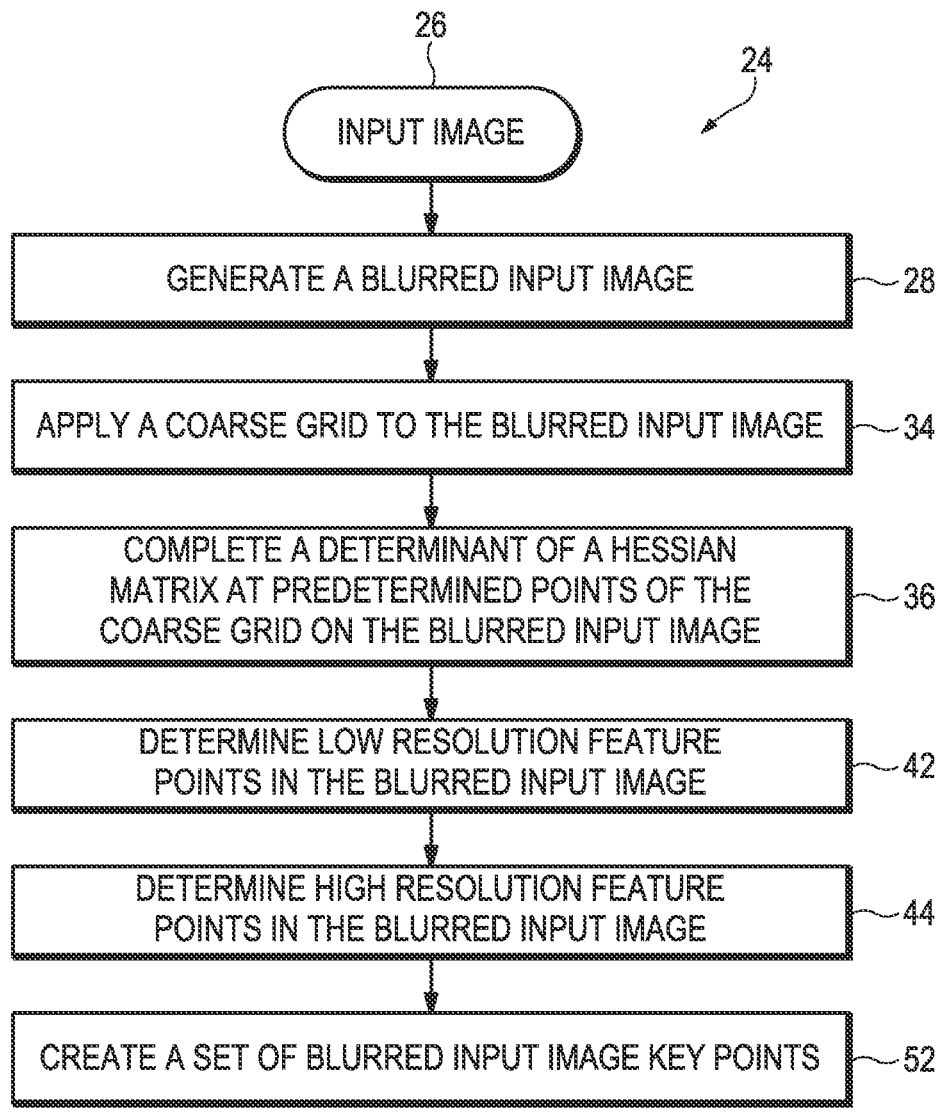
FIG. 2 shows a block diagram of an example of a feature extraction method.

A block diagram of an example of a feature extraction method 24 (for feature extraction component 16) is shown in FIG. 2. Feature extraction method 24 operates on both reference or first image 12 and target or second image 14, which is intended to be represented by the use of input image 26 in FIG. 2. Input image 26 can come from a variety of sources or signals. For example, the luminance channel may be used for YCC images. As another example, the green channel may be used for RGB images. As a another example, Bayer images may be directly used as long as the box filter (discussed below) is of size N×N and N is an even number such as 2, 4, 6, 8, etc.

Feature extraction method 24 includes the element or component 28 of generating a blurred input image which involves convolving input image 26 with a two-dimensional box filter to create a box filtered image. The dimensions and size of this box filter can vary. For example, an N×N box filter, where N=8, may be used for video image applications. As another example, an N×N box filter, where N can vary between 8 and 32, may be used for still image applications.

Figure 3:
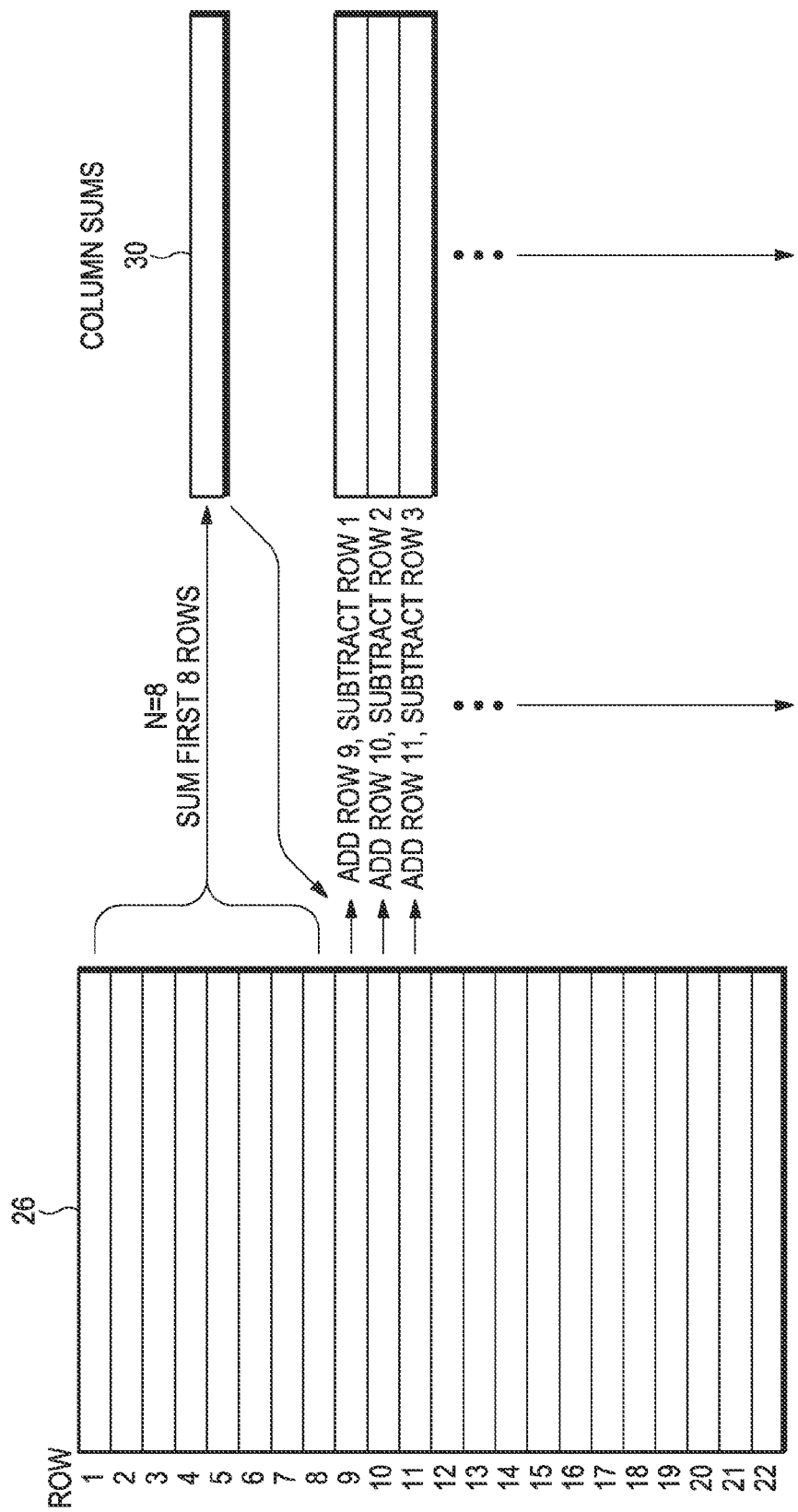
FIGS. 3-5 illustrate an example of the computation of an arbitrary size box filter of N×N.
Figure 4:
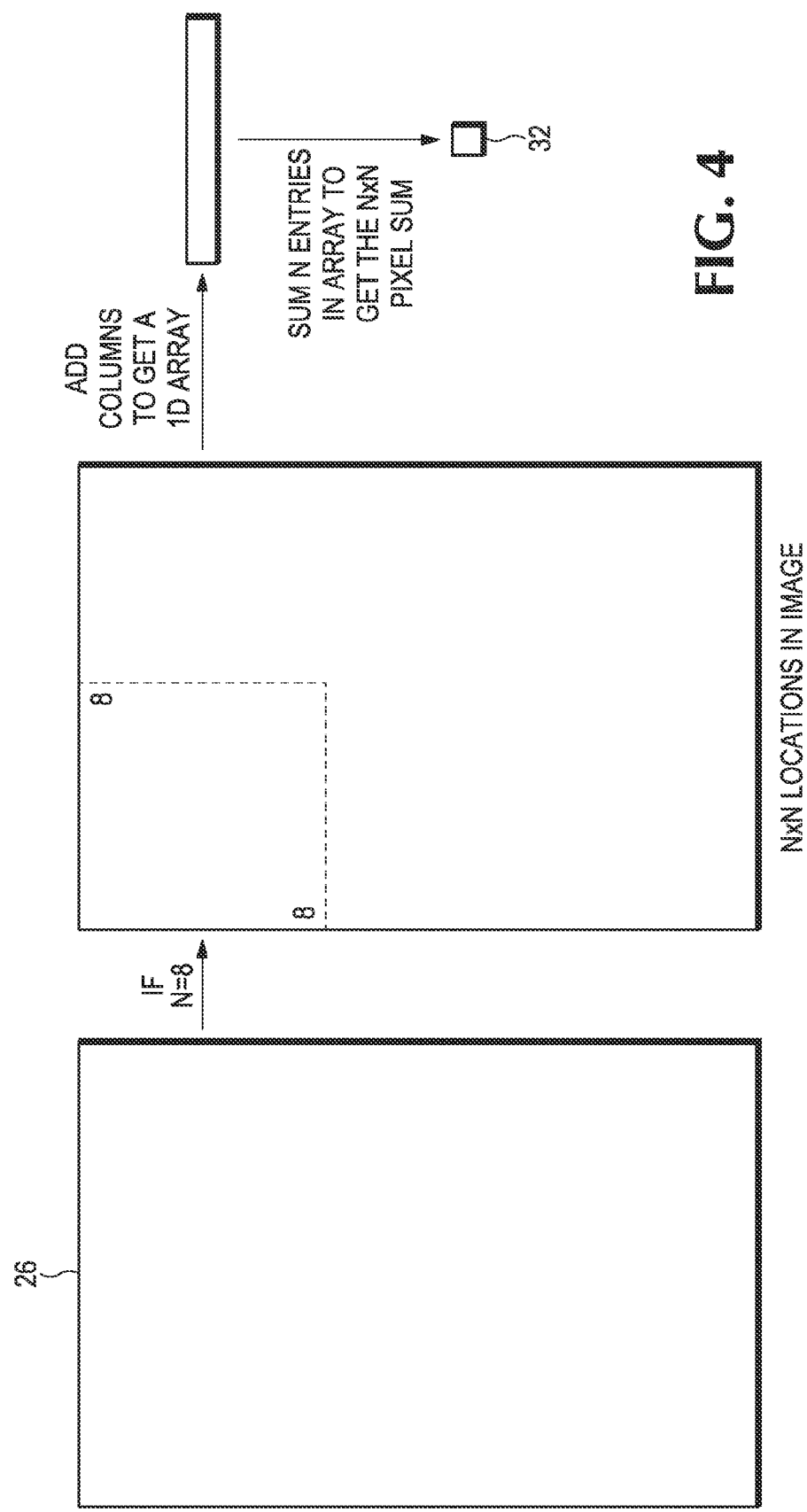
Figure 5:
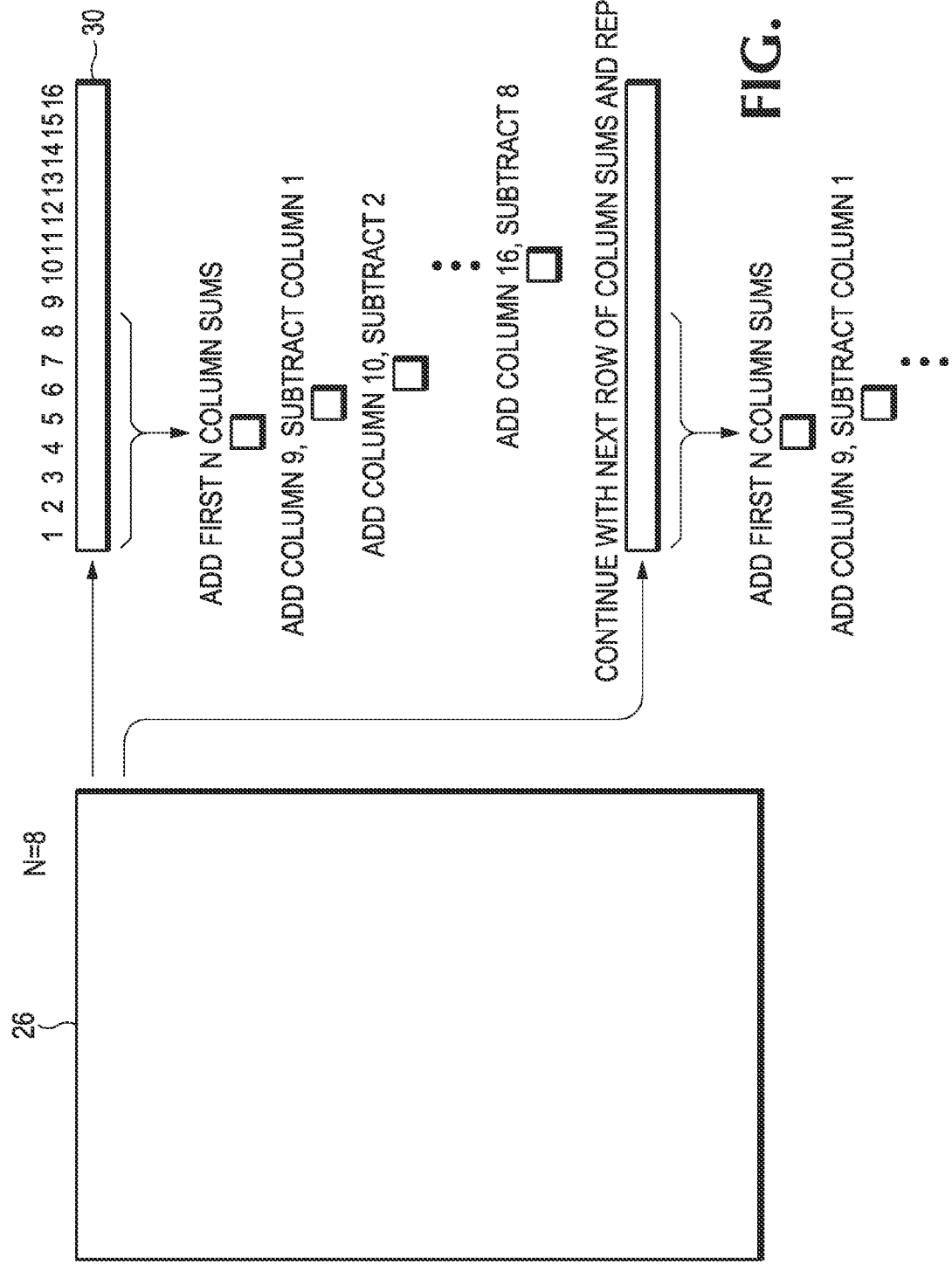

An arbitrary size box filter of N×N can be computed efficiently with only four (4) operations (two (2) adds and two (2) subtracts) per pixel in input image 26. This is done by maintaining a one-dimensional (1D) array 30 which stores the sum of N consecutive image rows, for example the first eight (8) rows, where N=8, as generally illustrated in FIG. 3. As input image 26 is scanned from top to bottom, 1D array 30 is updated by adding a new row (r) and subtracting the previous row (r−N). As generally illustrated in FIG. 4, an initial N×N pixel sum 32 is obtained by adding the first N entries in the 1D array. Scanning 1D array 30 left to right, a new pixel sum is obtained by adding a new column (c) and subtracting the previous column (c-N), as generally illustrated in FIG. 5. Each pixel sum is normalized by dividing by the area of the box. This division can be accomplished efficiently as a bit shift, if N is chosen to be equal to a power of two (2).

Figure 6:
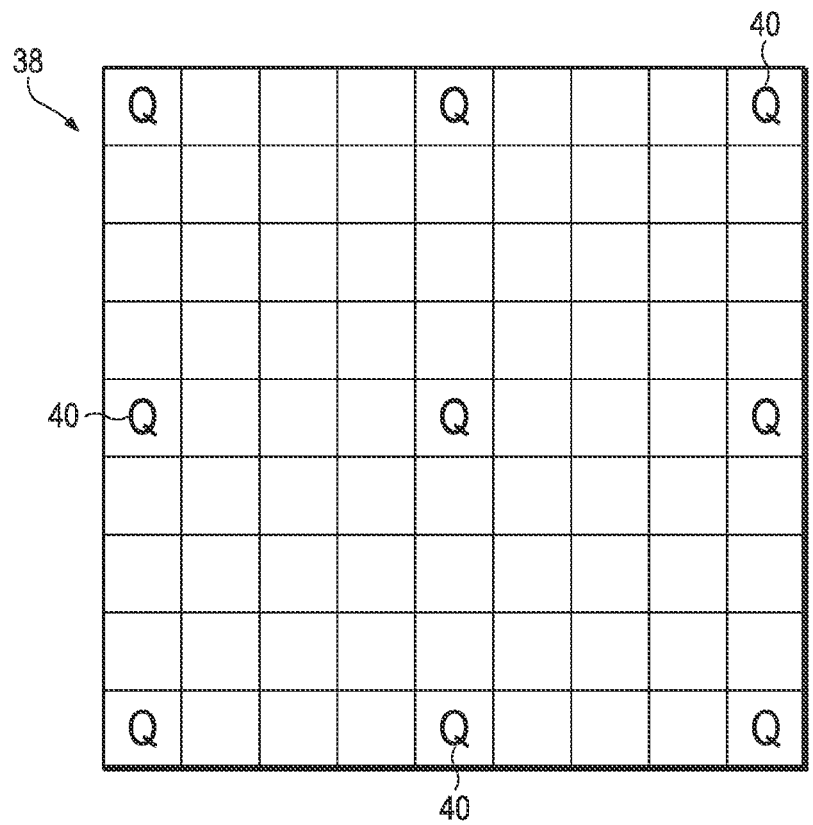
FIG. 6 illustrates an example of a portion of a coarse grid.

Referring again to FIG. 2, feature extraction method 24 also includes the element or component 34 of applying a coarse grid to the blurred input image. Method 24 additionally includes the element or component 36 of computing a determinant of a Hessian matrix at predetermined points of the coarse grid on the blurred input image. An example of a portion of such a coarse grid 38 is shown in FIG. 6. Coarse grid 38 includes a number of points or locations 40 indicated by the letter "Q" in FIG. 6. The pattern of coarse grid 38 is repeated all through the box filtered or blurred input image. What this pattern indicates is the determinant of the Hessian matrix (detH) is initially computed only once for every 4×4 pixels at the locations 40. The Hessian matrix (H) is a square matrix of second-order partial derivatives of a function (f). In this example, the Hessian matrix is:

$$H = \begin{bmatrix} fxx & fxy \\ fxy & fyy \end{bmatrix}$$

and the determinant of H is: $detH = f_{xx}f_{yy} - f_{xy}f_{xy}$. This means that the determinant of the Hessian matrix (detH) is only computed for $1/16^{th}$ of the blurred input image which increases the speed of method 24. Examples of the kernels $f_{xx}$, $f_{yy}$, and $f_{xy}$ used in computing the second-order partial derivatives are shown in FIG. 11.

Referring again to FIG. 2, method 24 further includes the element or component 42 of determining the low resolution feature points in the blurred input image. These low resolution feature points correspond to those locations 40 having local maxima of detH that exceed a pre-determined image dependent threshold relative to adjacent 3×3 Q neighbors. These feature points have low resolution because the local maxima of detH are computed on coarse grid 38.

The pre-determined image dependent threshold can be calculated as follows. The laplacian of the first input image 26 is computed in coarse grid 38. The laplacian is computed with the kernel:

$$lap = \begin{matrix} 0 & 0 & 1 & 0 & 0 \\ 0 & 0 & 0 & 0 & 0 \\ 1 & 0 & -4 & 0 & 1 \\ 0 & 0 & 0 & 0 & 0 \\ 0 & 0 & 1 & 0 & 0 \end{matrix}$$

This computation is performed only for every $1/16^{th}$ row and every $1/16^{th}$ column. The initial threshold is given by: $ThI = 2\ sdev(lap_i)$, where sdev is the standard deviation of $lap_i$. Using ThI on detH results in an initial number of feature points. If this is larger than the target, ThI is reduced until the target is reached. This is efficiently done using a histogram of the values of detH. If numI represents the initial number of feature points and numT represents the targeted number, then for the next input image 26 the lap is not computed and the initial threshold is computed as: $ThI(k+1) = (0.9\ numI/NumT)ThI(k)$, where $ThI(k+1)$ is the next input image 26 and $ThI(k)$ is the previous input image 26.

Figure 7:
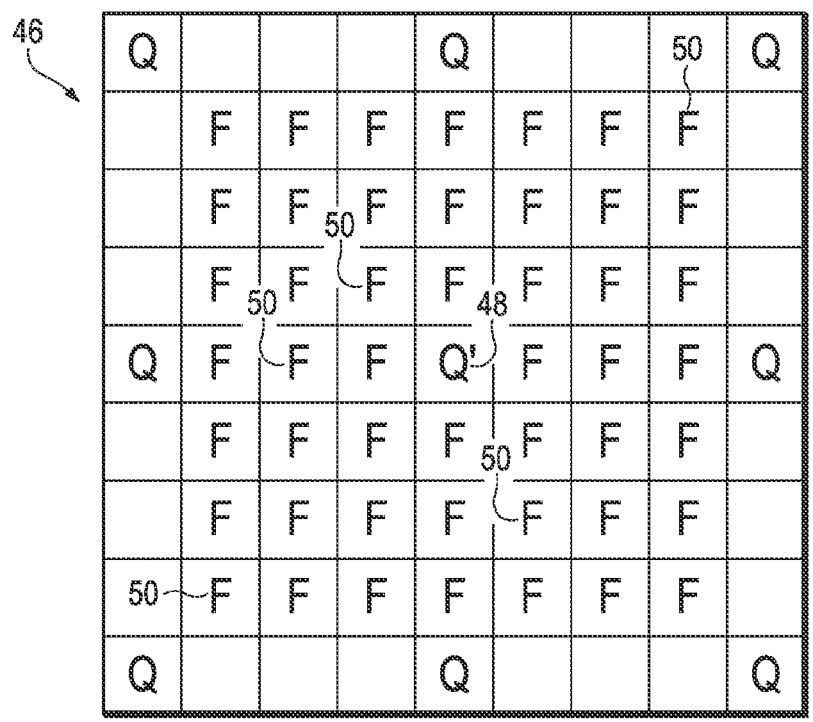
FIG. 7 illustrates an example of a portion of a fine grid.

Method 24 further includes the element or component 44 of determining the high resolution feature points in the blurred input image. This is accomplished by applying a fine grid 46 shown in FIG. 7 around each of the low resolution feature points (Q') 48 determined by element or component 42. The determinant of the Hessian matrix (detH) is then computed at each point or location 50, indicated by an "F" in FIG. 7. The maximum value of detH in fine grid 46 defines the final high resolution feature point. As can be seen, fine grid 46 measures 7×7 pixels in the example shown in FIG. 7.

Referring again to FIG. 2, feature extraction method 24 also includes the element or component 52 of creating a set of blurred input image key points. This set is created by selecting a predetermined number of high resolution feature points determined by element or component 44 that have the strongest Hessian matrix determinant values. A histogram of quantized Hessian matrix determinant values of the final high resolution feature points can be used to help facilitate this selection.

Figure 8:
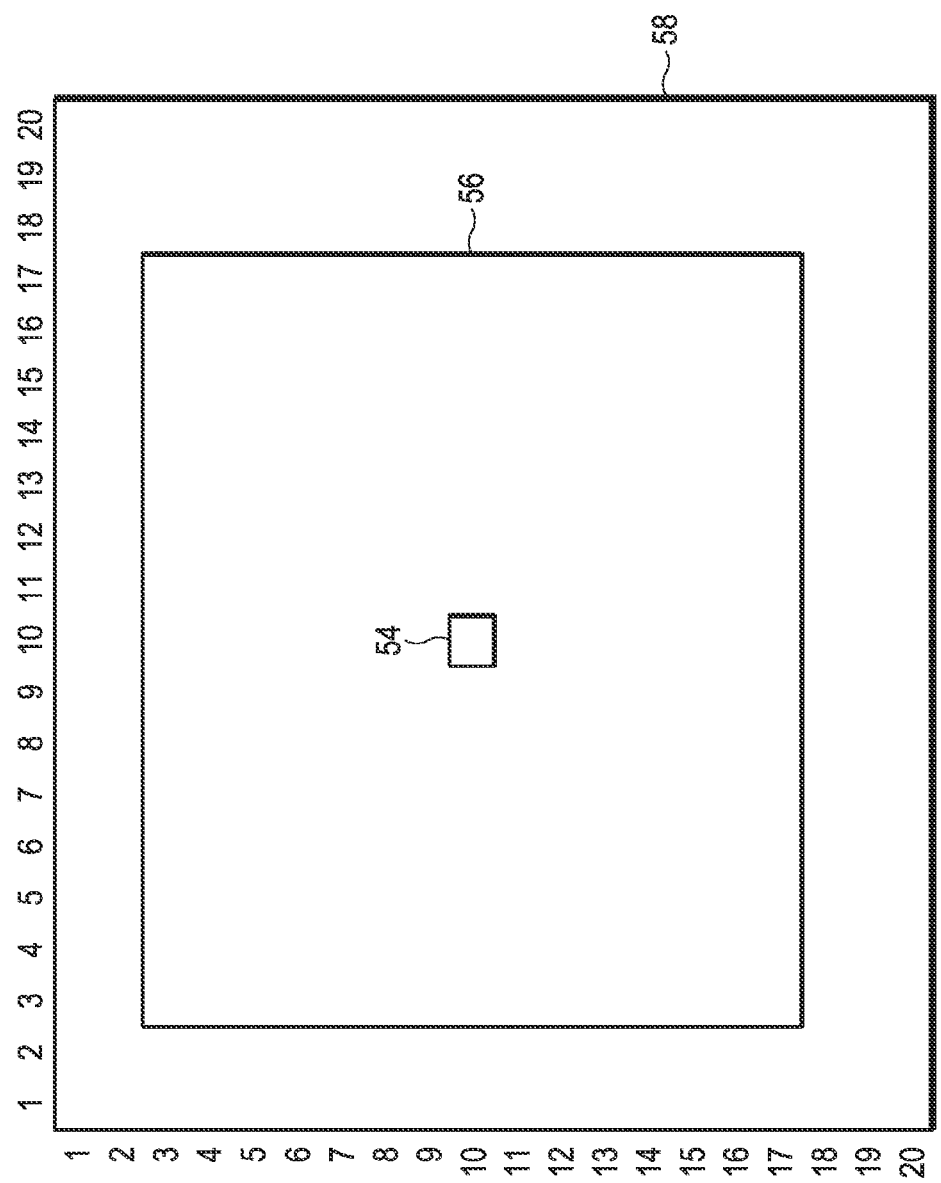
FIG. 8 illustrates an example of a window or patch centered about a feature point in a luminance plane.

Referring again FIG. 1, after completion of feature extraction module 16, feature based image registration method 10 proceeds to feature description module 18. Each of the high resolution feature points 54 created by feature extraction module 16 is assigned a simple descriptor that includes the luminance values in a window or patch 56 centered about such points 54 in image luminance plane 58 shown in FIG. 8. Window or patch 56 has a size of 2N×2N pixels, where N represents the size of the box filter N×N used in feature extraction module 16 and component 28 of method 24, as discussed above in connection with FIGS. 1 and 2. N=8 in the example illustrated in FIG. 8. The mean of these luminance values of window or patch 56 is removed or subtracted in order to provide robustness against changes in illumination between first or reference image 12 and second or target image 14.

Figure 9:
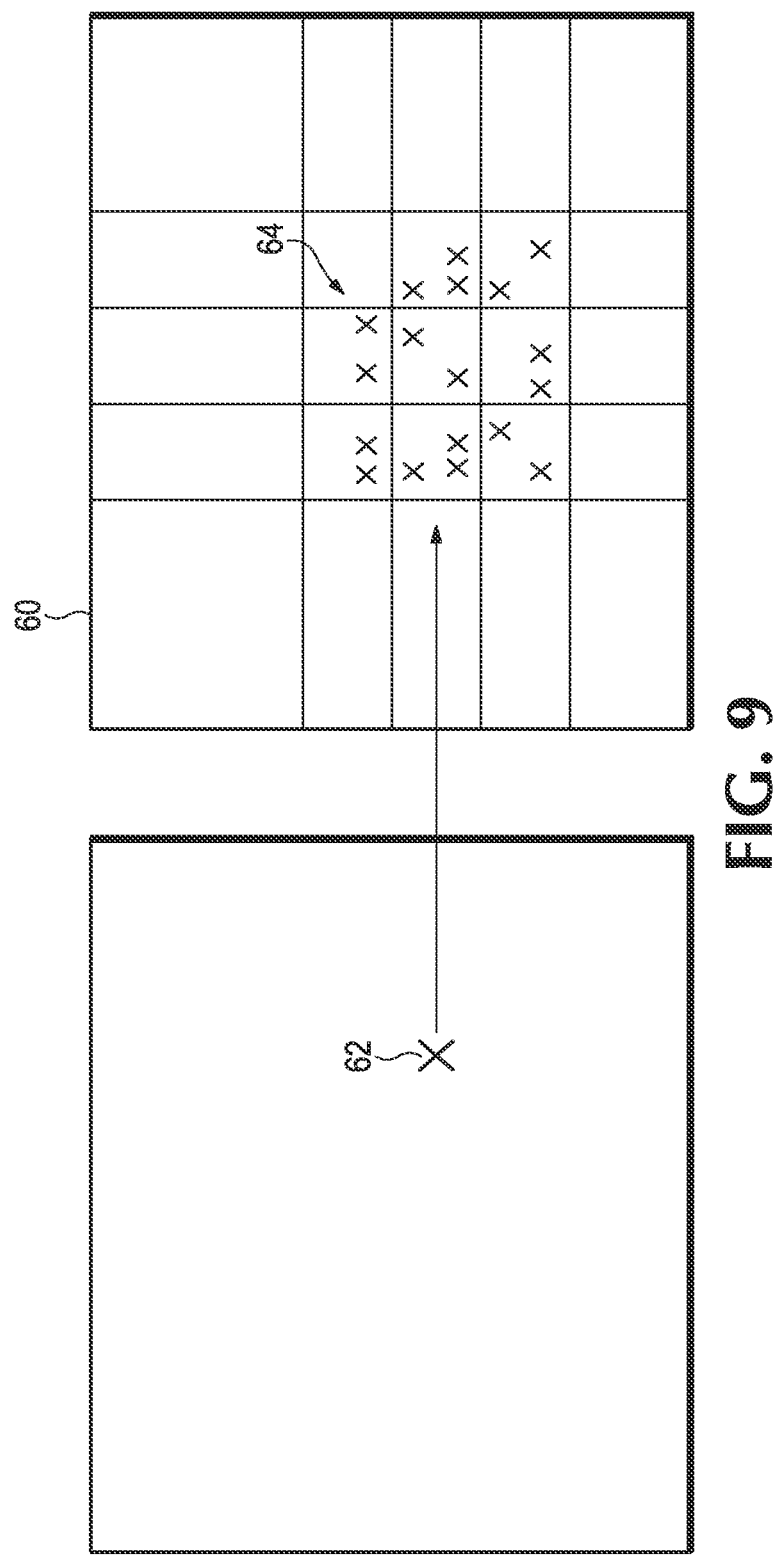
FIG. 9 is an example of a two-dimensional (2D) spatial index.

Referring again FIG. 1, after completion of feature description module 18, feature based image registration method 10 proceeds to feature matching module 20. Feature matching module 20 generates a list of pairs of matching feature points for reference or first image 12 and target or second image 14 created by feature description modules 18. An example of a two-dimensional (2D) spatial index of references 60 like that shown in FIG. 9 is used to avoid an exhaustive comparison of a feature point 62 from first or reference image 12 against every feature point from second or target image 14. Rather, a subset of feature points 64 is used which helps speed up the registration of first or reference image 12 and second or target image 14. Two-dimensional spatial index of references 60 consists of 32×24 tiles spanning the image dimensions. A reference list is generated for each tile consisting of references to all of the feature points which lie on that tile and the adjacent eight (8) neighboring tiles as shown in FIG. 9. Matching is based on a measure of closeness of feature point 62 to the feature points in subset 64. This measure of closeness can be determined by a variety of difference operators including by locating the pair of feature points within these constraints that have the smallest sum of absolute differences (SAD) in their feature descriptors.

Once one or more matching pairs of feature points are determined by feature matching module 20, feature based image registration method 10 proceeds to geometric transform estimation module 22. Module 22 utilizes the matching pairs of feature points and their positions to estimate a global affine transformation that maps first or reference image 12 into second or target image 14. Robustness against outliers is obtained by using either random sample consensus (RANSAC) or M-Estimation. Other approaches (e.g., a robust mean or utilization of the median of the motion vectors defined by matching pairs of feature points) can be used if correction of only translation is required, rather than translation, rotation, scaling and shear. These approaches also tend to be computationally less expensive and faster.

Figure 10:
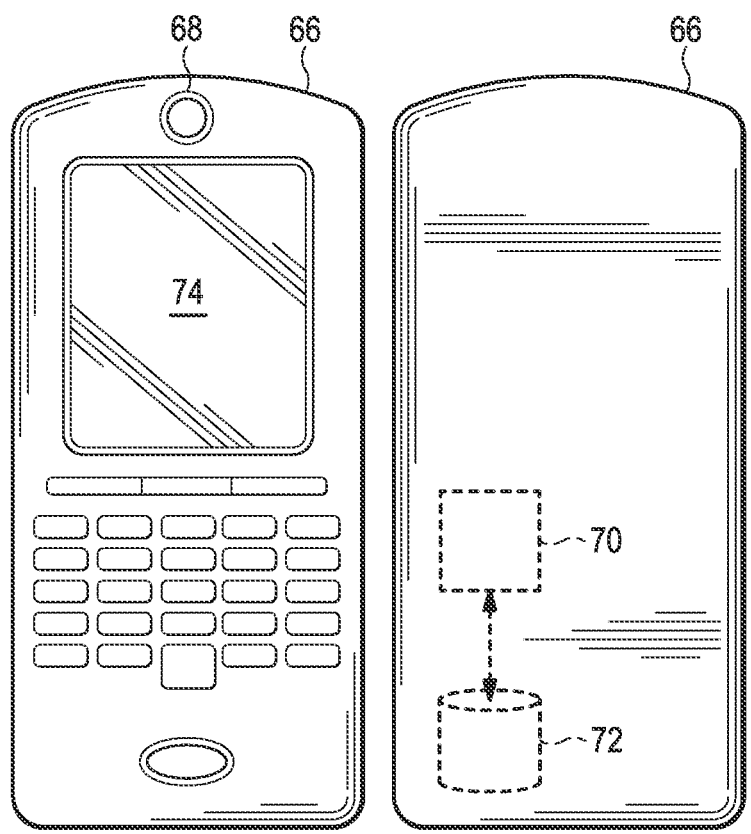
FIG. 10 shows an example of a mobile device.

FIG. 10 shows an example of a mobile device 66 in which the present invention may be utilized. Mobile device 66 includes a camera 68, a processor 70, a non-transitory computer-readable storage medium 72 that stores instructions for registering images captured by camera 68 in accordance with the present invention, and a display screen 74. Although mobile device 66 is a cell phone, other mobile devices such as personal digital assistants, portable computers, cameras, and video recorders may utilize the present invention.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art. The spirit and scope of the present invention are to be limited only by the terms of the following claims.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. A method, comprising:
   applying a first grid to a blurred first image;
   computing a determinant of a Hessian matrix at predetermined points of the first grid on the blurred first image;
   determining low resolution feature points in the blurred first image based on the first grid;
   applying a second grid to the blurred first image, the second grid being finer than the first grid;
   computing a determinant of a Hessian matrix at predetermined points of the second grid on the blurred first image;
   determining high resolution feature points in the blurred first image based on the second grid;
   creating a first set of blurred first image key points;
   extracting a first feature descriptor for each of the blurred first image key points;
   applying the first grid to a blurred second image;
   computing a determinant of a Hessian matrix at predetermined points of the first grid on the blurred second image;
   determining low resolution feature points in the blurred second image based on the first grid;
   applying the second grid to the blurred second image;
   computing a determinant of a Hessian matrix at predetermined points of the second grid on the blurred second image;
   determining high resolution feature points in the blurred second image based on the second grid;
   creating a second set of blurred second image key points;
   extracting a second feature descriptor for each of the blurred second image key points;
   selecting blurred first image key points and blurred second image key points for matching based on a measure of closeness of the first feature descriptors and the second feature descriptors; and
   mapping the first image into the second image based on matching pairs of blurred first image key points and blurred second image key points.

2. The method of claim 1, further comprising generating the blurred first image, wherein generating the blurred first image includes convolving the first image with a two-dimensional box filter.

3. The method of claim 2, wherein the first image includes a plurality of pixels and further comprising computing a predetermined sized box filter with four operations per pixel.

4. The method of claim 1, wherein the predetermined locations on the first grid occur only once for every 4×4 pixels of the blurred first image.

5. The method of claim 1, wherein determining the low resolution feature points in the blurred first image includes selecting local maxima of the determinant of the Hessian matrix that exceed a pre-determined image dependent threshold.

6. The method of claim 1, wherein the second grid measures 7×7 pixels in the blurred first image.

7. The method of claim 1, wherein creating a set of blurred first image key points include selecting a predetermined number of high resolution feature points that have strongest Hessian matrix determinant values.

8. The method of claim 7, wherein the high resolution feature points are selected from a histogram of the quantized Hessian matrix determinant values.

9. The method of claim 1, wherein extracting the first feature descriptor for each of the blurred first image key points includes utilizing luminance values in a window centered about each of the blurred first image key points.

10. The method of claim 9, wherein extracting the first feature descriptor for each of the blurred first image key points further includes removing a mean of the luminance values in the window centered about each of the blurred first image key points to provide robustness against changes of illumination between the first image and the second image.

11. The method of claim 1, wherein selecting blurred first image key points and blurred second image key points for matching based on a measure of closeness of the first feature descriptors and the second feature descriptors includes applying a spatial two-dimensional index to the first feature descriptors and the second feature descriptors to limit a number of first feature descriptors and second feature descriptors for matching based on a measure of closeness.

12. The method of claim 11, wherein selecting blurred first image key points and blurred second image key points for matching based on the measure of closeness of the first feature descriptors and the second feature descriptors includes determining the measure of closeness with a difference operator.

13. The method of claim 1, wherein mapping the first image into the second image based on matching pairs of blurred first image key points and blurred second image key points includes determining a global affine transformation.

14. The method of claim 1, further comprising utilizing a mobile device to register the first image and the second image.

15. A non-transitory computer-readable storage medium storing instructions, when executed by a processor, cause the processor to:
   apply a first grid to a blurred first image;
   compute a determinant of a Hessian matrix at predetermined points of the first grid on the blurred first image;
   determine low resolution feature points in the blurred first image based on the first grid;
   apply a second grid to at least portions of the blurred first image, the second grid being finer than the first grid;
   compute a determinant of a Hessian matrix at predetermined points of the second grid on the blurred first image;
   determine high resolution feature points in the blurred first image based on the second grid;
   create a first set of blurred first image key points;

extract a first feature descriptor for each of the blurred first image key points;
apply the first grid to a blurred second image;
compute a determinant of a Hessian matrix at predetermined points of the first grid on the blurred second image;
determine low resolution feature points in the blurred second image based on the first grid;
apply the second grid to at least portions of the blurred second image;
compute a determinant of a Hessian matrix at predetermined points of the second grid on the blurred second image;
determine high resolution feature points in the blurred second image based on the second grid;
create a second set of blurred second image key points
extract a second feature descriptor for each of the blurred second image key points;
select blurred first image key points and blurred second image key points for matching based on a measure of closeness of the first feature descriptors and the second feature descriptors; and
map the first image into the second image based on matching pairs of blurred first image key points and blurred second image key points.

16. The non-transitory computer-readable storage medium of claim 15, further comprising stored instructions for registering a first image and a second image that, when executed by a processor, cause the processor to convolve the first image with a two-dimensional box filter to generate the blurred first image.

17. The non-transitory computer-readable storage medium of claim 16, further comprising stored instructions for registering a first image and a second image that, when executed by a processor, cause the processor to compute a predetermined sized box filter with four operations for each pixel of the first image.

18. The non-transitory computer-readable storage medium of claim 15, further comprising stored instructions for registering a first image and a second image that, when executed by a processor, cause the processor to select local maxima of the determinant of the Hessian matrix that exceed a pre-determined image dependent threshold to determine the low resolution feature points in the blurred first image includes.

19. The non-transitory computer-readable storage medium of claim 15, further comprising stored instructions for registering a first image and a second image that, when executed by a processor, cause the processor to apply the second grid around each of the low resolution feature points in the blurred first image, compute a determinant of a Hessian matrix at each point of the second grid, and select a maximum value of the determinant to determine the high resolution feature points in the blurred first image.

20. The non-transitory computer-readable storage medium of claim 15, further comprising stored instructions for registering a first image and a second image that, when executed by a processor, cause the processor to select a predetermined number of high resolution feature points that have strongest Hessian matrix determinant values to create a set of blurred first image key points.

21. The non-transitory computer-readable storage medium of claim 15, further comprising stored instructions for registering a first image and a second image that, when executed by a processor, cause the processor to utilize luminance values in a window centered about each of the blurred first image key points to extract the first feature descriptor for each of the blurred first image key points.

22. The non-transitory computer-readable storage medium of claim 15, further comprising stored instructions for registering a first image and a second image that, when executed by a processor, cause the processor to apply a spatial two-dimensional index to the first feature descriptors and the second feature descriptors to limit a number of first feature descriptors and second feature descriptors for matching based on a measure of closeness.

23. The non-transitory computer-readable storage medium of claim 22, further comprising stored instructions for registering a first image and a second image that, when executed by a processor, cause the processor to determine the measure of closeness with a difference operator.

24. The non-transitory computer-readable storage medium of claim 15, further comprising stored instructions for registering a first image and a second image that, when executed by a processor, cause the processor to determining a global affine transformation to map the first image into the second image based on matching pairs of blurred first image key points and blurred second image key points.

25. The non-transitory computer-readable storage medium of claim 15, in a mobile device.

* * * * *

UNITED STATES PATENT AND TRADEMARK OFFICE
CERTIFICATE OF CORRECTION

| | | |
|---|---|---|
| PATENT NO. | : 8,675,997 B2 | Page 1 of 1 |
| APPLICATION NO. | : 13/193988 | |
| DATED | : March 18, 2014 | |
| INVENTOR(S) | : Oscar Zuniga et al. | |

It is certified that error appears in the above-identified patent and that said Letters Patent is hereby corrected as shown below:

In the Claims

In column 7, line 44, in Claim 18, delete "image includes." and insert -- image. --, therefor.

Signed and Sealed this
Twenty-third Day of September, 2014

Michelle K. Lee
*Deputy Director of the United States Patent and Trademark Office*